UNITED STATES PATENT OFFICE.

JOHN H. FILBERT, OF BALTIMORE, MARYLAND.

ART OF IMPROVING THE ODOR OF LARD SUBSTITUTES.

No. 929,925.      Specification of Letters Patent.      Patented Aug. 3, 1909.

Application filed July 3, 1908. Serial No. 441,861.

*To all whom it may concern:*

Be it known that I, JOHN H. FILBERT, a citizen of the United States, residing at Baltimore, in the State of Maryland, have invented certain new and useful Improvements in the Art of Improving the Odor of Lard Substitutes, of which the following is a specification.

This invention relates to the art of improving the odor of so-called lard compounds, or lard substitutes, which have cotton-seed oil as one of the principal ingredients.

It is well-known that when lard compounds or substitutes which have cotton-seed oil as one of the principal components, are used in the domestic processes of frying, baking and other forms of cooking, the heat of the cooking process develops an odor that is objectionable. This odor is characteristic of the cotton-seed oil, and is so objectionable that many persons refuse to use lard compounds that include this oil.

It is well-known that the manufacturers of animal products make so-called lard compounds or substitutes for lard that contain cotton-seed oil and certain ingredients for stiffening that vary in their composition; the stiffening ingredients are the products of animal fats, generally beef fats in one form or another. One manufacturer, for instance, will use oleo stearin, another will use oleo stock, and still another will use edible tallow, but all the manufacturers use cotton-seed oil.

In rendering hog fat in the open kettle process to produce lard, the animal tissue is affected by becoming brown and rising to the surface, from which it is removed. This animal tissue is collected and while hot is put in a press and the oil is expressed from it; the residuum left in the press is in the form of a hard cake or mass of animal tissue of a brown color, and is known as "crackling". This crackling contains the essence odor or flavor that characterizes hog's lard when heated in the frying pan.

The inventive idea here involved is to utilize the essence, odor or flavor of animal tissue or crackling and impart the same to so-called lard compounds or substitutes which contain cotton-seed oil as an ingredient.

An object of the invention is to provide as an improved article, a lard compound or a substitute for lard, having as components cotton-seed oil and any of the well-known products of fat, and which shall also have the essence, odor or flavor of fresh animal crackling.

Another object of the invention is to provide a process for improving the odor or flavor of so-called lard compounds, or substitutes for lard, which have cotton-seed oil as one of the principal ingredients, by imbuing the said compound with the essence, odor or flavor residing in animal crackling.

It is to be understood that my present invention is applicable to the so-called lard compounds, or substitutes for lard, whose manufacture has already been finished, and it is also applicable to the mass or to the unfinished article.

I take any so-called lard-compound, or substitute for hog's lard, either finished or in course of manufacture and use animal crackling for the purpose of imparting the essence, odor or flavor of the said crackling to the compound or substitute, for the purpose of suppressing or destroying the objectionable odor of the cotton-seed oil which is in the compound.

The process of treating the compound is substantially as follows,— of course any quantity of compound may be treated at a time, and the quantity would be limited only by the facilities of the manufacturer, for illustration one hundred pounds will be assumed as under treatment. A finished article of lard compound has the stiffness of ordinary hog's lard, and if it is desired to treat some of the finished article, the quantity named should be placed in a suitable vessel to which heat in some form may be applied, and the heat acting on the stiff condition of the compound reduces it to a liquid condition, like oil; the exact degree of heat to be employed is not essential, but may be as high as 350 degrees Fahrenheit. When the proper liquid condition of the mass has been attained, fresh sweet animal tissue or crackling is added, (by preference the crackling may be ground to fine granular condition) in the proportion of about five per cent. by weight, that is, for 100 pounds of compound add 5 pounds of crackling. The mass may be stirred or agitated to thoroughly distribute the crackling. If the compound is heated to 350 degrees when the crackling is added, only a short period of time will be necessary to effect the blend, say five minutes; but a longer time may be allowed for blending if a lower degree of heat is used. When the blend has been effected, and while the compound is still in a liquid condition, the crackling should be separated from the compound simply for the purpose of avoiding any objectionable appearance to the finished article. In order to separate or remove the crackling from the compound, the latter, while still in a liquid condition, may be passed through a filter and then the compound will be found to be imbued with the essence of the animal crackling. Where hog crackling is used the compound will have the agreeable odor or flavor of sweet fresh lard when heated in the frying pan; where beef crackling is used the compound will have the odor or flavor of rendered beef fat.

When so-called lard compounds or substitutes which have been thus improved are heated in the process of cooking, none of the objectionable odors of cotton-seed oil will be perceptible.

It will be understood that the process described is applicable to the ingredients, or the mass of ingredients, in the course of the primary manufacture of the lard compound or substitute; and that in any case the animal crackling may be added when the mass has the desired conditions of temperature and liquidity.

The manufacturer may congeal the compound by well-known methods.

It will be understood that the essential idea of this invention, so far as the article is concerned, is to imbue the lard substitute that contains cotton-seed oil, or other vegetable oil, with the essence, flavor or odor of animal crackling or other animal tissue.

Having thus described my invention what I claim and desire to secure by Letters Patent is,—

1. A substitute for lard, including a vegetable oil for the body, a stiffening ingredient, and the essence of heated animal tissue.

2. A substitute for lard consisting of beef-fat and cotton-seed oil, combined with hog-crackling essence.

3. A substitute for lard consisting of beef-fat and cotton-seed oil which has absorbed animal crackling essence.

4. A substitute for lard consisting of beef-fat and cotton-seed oil combined with the essence of heated animal tissue.

5. The process of improving lard substitutes containing a stiffening fat and vegetable oil, consisting in imbuing the same with the essence of heated animal tissue.

6. The process of improving so-called lard compounds or substitutes, consisting in heating the compound to reduce it to a liquid condition; mixing animal crackling with the compound so as to imbue the latter with the flavor of the crackling, and then separating the crackling from the compound.

7. The process of improving so-called lard compounds or substitutes, consisting of reducing the compound to a liquid condition by means of heat, and then imbuing the heated compound with the essence, flavor or odor extracted from animal crackling.

8. The process of improving substitutes for lard which comprise a compound containing vegetable oil, consisting in mixing with the compound while the latter is heated, animal tissue to imbue the compound with the flavor thereof, separating the tissue from the compound and then congealing the compound.

In testimony whereof I affix my signature in presence of two witnesses.

JOHN H. FILBERT.

Witnesses:
   CHARLES B. MANN, Jr.,
   G. FERDINAND VOGT.